(12) United States Patent
Carruth et al.

(10) Patent No.: US 8,231,278 B1
(45) Date of Patent: Jul. 31, 2012

(54) REMOVABLE CAM JOURNAL

(75) Inventors: Brian C. Carruth, Burbank, OH (US); Robert D. Childers, Stow, OH (US)

(73) Assignee: Autosales, Incorporated, Tallmadge, OH (US)

( * ) Notice: Subject to any disclaimer, the term of this patent is extended or adjusted under 35 U.S.C. 154(b) by 603 days.

(21) Appl. No.: 12/383,614

(22) Filed: Mar. 30, 2009

(51) Int. Cl.
*F16C 33/04* (2006.01)

(52) U.S. Cl. ...... 384/294; 384/428; 384/434; 123/195 R (58) Field of Classification Search ............. 384/294, 384/428, 434; 123/195 R
See application file for complete search history.

(56) References Cited

U.S. PATENT DOCUMENTS

| | | | | |
|---|---|---|---|---|
| 5,215,047 | A * | 6/1993 | Neutgens | 123/90.37 |
| 5,509,387 | A * | 4/1996 | Kaminski et al. | 123/195 R |
| 7,322,750 | B1 * | 1/2008 | Besselman | 384/432 |
| 7,857,517 | B1 * | 12/2010 | Vicars | 384/430 |
| 2006/0140525 | A1 * | 6/2006 | Giberson | 384/428 |

* cited by examiner

*Primary Examiner* — Patrick Mackey
(74) *Attorney, Agent, or Firm* — Renner, Kenner, Greive, Bobak, Taylor & Weber (57) ABSTRACT

A cam journal for attaching a camshaft to a cylinder head includes an upper portion and a lower portion. The upper portion and lower portion of the cam journal have a generally semi-circular bearing surfaces, chamfer regions, and circumferential beveled edges. The lower portions also include oil holes. The cam journal is removably attached to a cylinder head by first connecting multiple cam journal lower portions to the cylinder head, then positioning a camshaft on those lower portions. Upper portions are placed over the camshaft and are connected to the lower portions. A fastener is used to securely connect the cam journal to the cylinder head.

14 Claims, 8 Drawing Sheets

REMOVABLE CAM JOURNAL

TECHNICAL FIELD

The present invention relates to automobile engine parts. More specifically, the present invention relates to a removable cam journal for connecting a camshaft to a cylinder head.

BACKGROUND ART

Engines having an overhead camshaft arrangement include at least one camshaft that is connected to the cylinder head. Cylinder heads for overhead camshaft engines include integral posts (or other similar structures) with semi-circular bearing surfaces to support and connect the camshaft to the cylinder head. These integral posts may extend beyond the top deck surface of the cylinder head where the valve cover is attached to the cylinder head. To connect a camshaft to a cylinder head, the camshaft is situated in the cylinder head so that the bearings of the camshaft are positioned in the semi-circular bearing surfaces of the integral posts of the cylinder head. Cam caps, also having semi-circular bearing surfaces, are placed over the bearings of the camshaft and are connected to the integral posts of the cylinder head. Once the cam caps are attached, the semi-circular bearing surfaces of the integral posts and the semi-circular bearing surfaces of the cam caps form a camshaft bore that completely surrounds the bearings of the camshaft, and the camshaft is thus securely attached to the cylinder head.

Machining the camshaft bore presently requires large and expensive equipment. This is because the cam caps are mounted to a cylinder head or cylinder head casting and then an expensive drill tool having a large drill bit is used to precision-machine the bores between the cam caps and the integral posts on the cylinder head.

In an operating engine, a cylinder head is exposed to harsh conditions including heat created by combustion and friction, as well as wear and tear caused by the many moving valvetrain components. Under these harsh conditions, the cylinder head may become deformed, cracked, or otherwise damaged. For example, the bearing surfaces on the integral posts and cam caps may become gouged if these pieces are not properly lubricated. If the integral posts which support the camshaft (including the bearing surfaces) are damaged, the rotation of the camshaft is likely to be impacted, which can result in diminished performance of the engine or possibly damage to other engine components. Although the integral posts of a cylinder head are only a small portion of the entire cylinder head, damage to these integral posts often requires that the entire cylinder head be replaced.

In addition to replacing cylinder heads when they are damaged, automotive enthusiasts often replace or modify existing valvetrain components to improve the performance of an engine. For example, installing after-market camshafts with specially designed cam lobes is a popular way to improve an engine's horsepower and torque profile. Thus, automotive enthusiasts prefer modular components which may be installed, removed, or changed as desired.

Accordingly, a need exists in the art for a replaceable and serviceable cam journal which connects a camshaft to a cylinder head.

DISCLOSURE OF THE INVENTION

It is therefore an object of one aspect of the present invention to provide a cam journal for attaching a camshaft to a cylinder head in an overhead camshaft engine having an upper portion and a lower portion which is not integral with the cylinder head.

It is an object of another aspect of the present invention to provide an engine cylinder head including a cylinder head, a camshaft, and a cam journal that is removably attached to the cylinder head. It is an object of an additional aspect of the present invention to provide a method of connecting a camshaft to a cylinder head with an overhead camshaft arrangement.

These and other objects of the present invention, as well as the advantages thereof over existing prior art forms, which will become apparent from the description to follow, are accomplished by the improvements hereinafter described and claimed.

In general, a cam journal in accordance with one aspect of the present invention is designed to attach a camshaft to a cylinder head of an overhead camshaft engine. The cam journal includes an upper portion and a separate lower portion which is attached to the cylinder head and to the upper portion. When the upper and lower portions are attached, a bearing surface is formed to define a camshaft bore between the upper and lower portions.

In accordance with another aspect of the invention, an engine component includes a cylinder head, a camshaft, and a cam journal that is removably attached to the cylinder head. The cam journal includes an upper portion and a lower portion defining a bearing surface for the camshaft.

The method of installing a camshaft on a cylinder head of an overhead camshaft engine includes the steps of connecting at least one lower portion of a cam journal to the cylinder head, positioning the camshaft in that at least one lower portion, placing at least one upper portion of a cam journal over the camshaft, and connecting each upper portion to each lower portion.

A preferred exemplary cam journal for a cylinder head according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

A cam journal constructed according to the concepts of the present invention is designated generally by the numeral 20 and includes an upper portion generally indicated by the numeral 22 and a lower portion generally indicated by the numeral 24. Upper portion 22 is generally arch-shaped and includes a top surface 26, a bottom surface 28, and opposed front and back surfaces 30. Cam journal 20 is adapted for use with a camshaft having an axis of rotation direction A. Upper portion 22 is provided with a generally semi-circular-shaped upper bearing surface 32, which opens toward bottom surface 28 with its uppermost point being positioned toward top surface 26.

Figure 1:
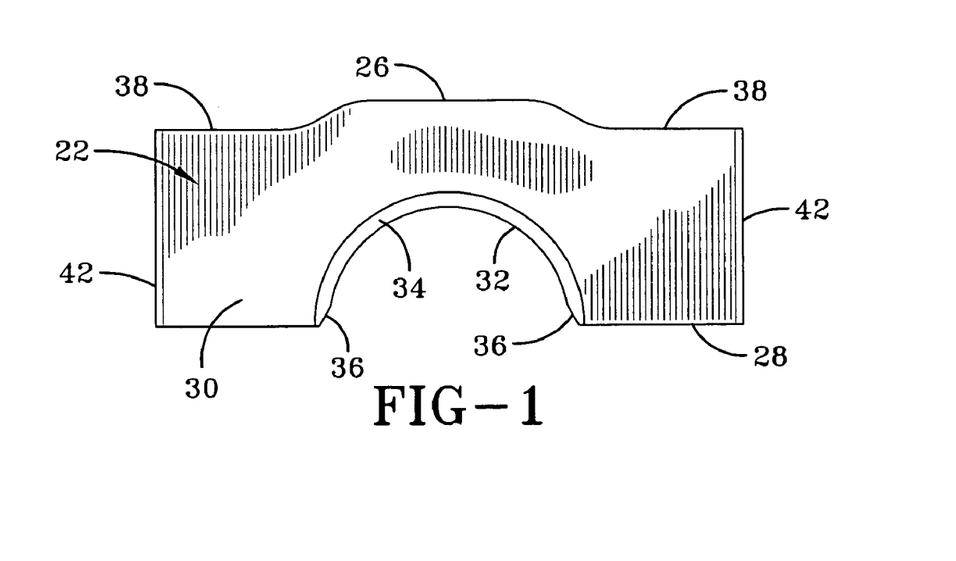
FIG. 1 is a front elevational view of an upper portion of a cam journal constructed according to the concepts of the present invention.
Figure 2:
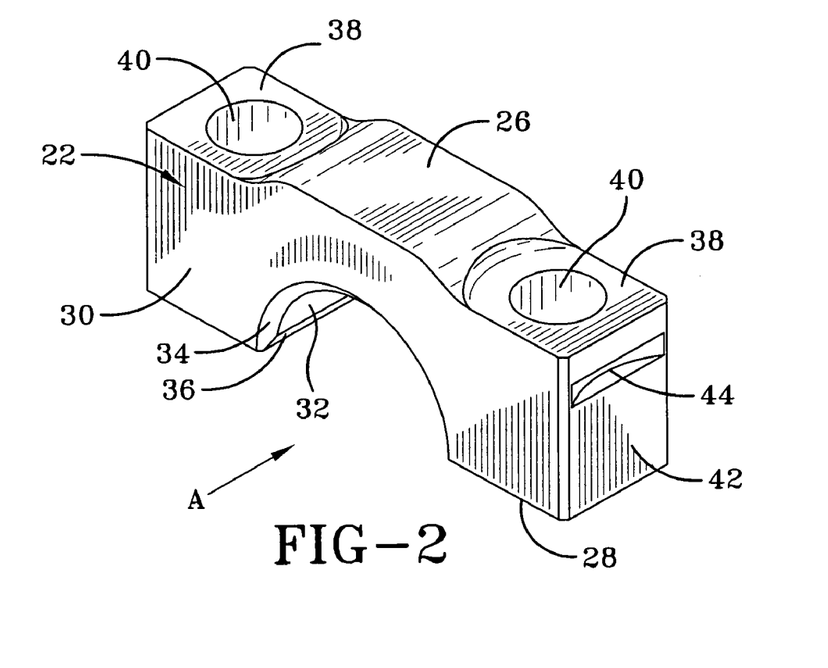
FIG. 2 is a perspective view of the upper portion shown in FIG. 1.

As best seen in FIGS. 1 and 2, upper bearing surface 32 is provided with a circumferential beveled edge 34 and diametrically-opposed chamfer regions 36. Circumferential beveled edge 34 connects front surface 30 to upper bearing surface 32 so that upper bearing surface 32 has a lesser axial extent in the A-axis direction than the top surface 26 or bottom surface 28. Diametrically-opposed chamfer regions 36 connect bottom surface 28 to upper bearing surface 32 at an angle other than ninety degrees.

Upper portion 22 may optionally include shoulders 38 below top surface 26. Holes 40 extend through upper portion 22 from shoulders 38 to bottom surface 28. Upper portion 22 also includes identical side surfaces 42 which may include a notch 44 which is useful for gripping the upper portion 22.

Figure 3:
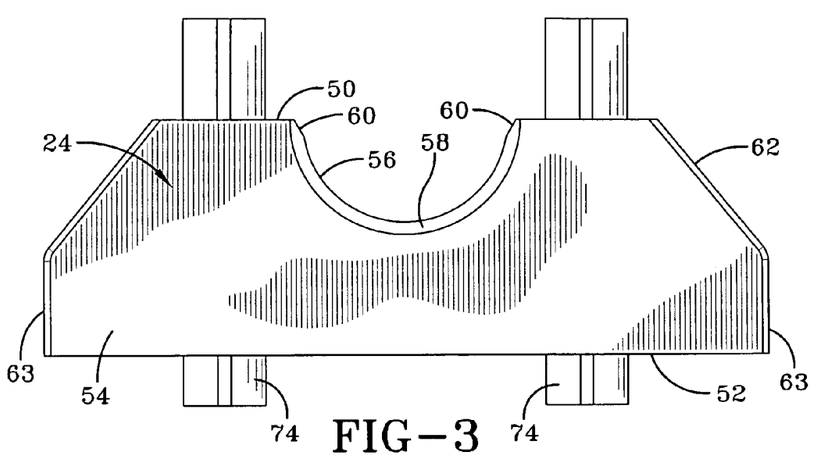
FIG. 3 is a front elevational view of a lower portion of a cam journal constructed according to the concepts of the present invention.
Figure 4:
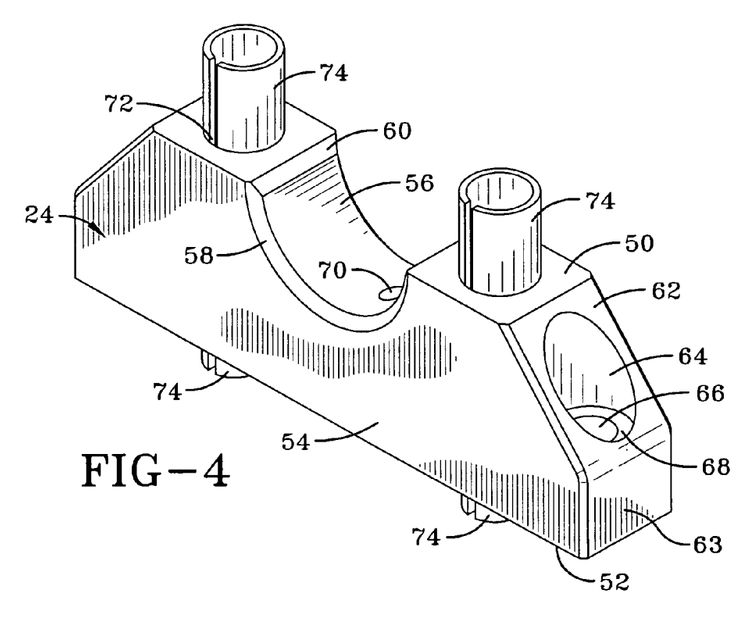
FIG. 4 is a perspective view of the lower portion shown in FIG. 3.

As seen in FIGS. 3 and 4, the lower portion 24 of cam journal 20 includes a top surface 50, a bottom surface 52, and opposed front and back surfaces 54. A generally semi-circular-shaped lower bearing surface 56 opens toward top surface 50 with its lowermost point positioned toward bottom surface 52.

Like upper bearing surface 32, lower bearing surface 56 is provided with a circumferential beveled edge 58 and diametrically-opposed chamfer regions 60. Circumferential beveled edge 58 connects front surface 54 to lower bearing surface 56 so that lower bearing surface 56 has a lesser axial extent in the A-axis direction than the top surface 50 or bottom surface 52. Diametrically-opposed chamfer regions 60 connect top surface 50 to lower bearing surface 56 at an angle other than ninety degrees.

Lower portion 24 may also includes shoulders 62 which extend angularly from surface 50 to opposed generally vertical side surfaces 63. As best seen in FIG. 4, each side of lower portion 24 includes two concentric holes, a larger diameter hole 64 through shoulders 62 and a smaller diameter hole 66 through bottom surface 52. The larger diameter hole 64 extends from the shoulder 62 toward the bottom surface 52, but does not reach bottom surface 52. The smaller diameter hole 66 extends from the bottom surface 52 to the larger diameter hole 64. A shelf 68 is thereby formed at the intersection of these two holes. Lower portion 24 also includes an oil hole 70 which extends from the lower bearing surface 56 to the bottom surface 52.

Lower portion 24 also includes openings 72 which extend from top surface 50 to bottom surface 52, and whose diameters are equal to the diameters of holes 40 of upper portion 22. As shown in FIGS. 3 and 4, spring bushings 74 extend through openings 72 of lower portion 24 and protrude beyond top surface 50 and beyond bottom surface 52. If desired, spring bushings 74 may be press fit into openings 72 to ensure a secure connection between lower portion 24 and bushings 74. Of course, other bushings or similar items may be used in place of spring bushings 74 so long as they are of comparable size and quality.

Figure 5:
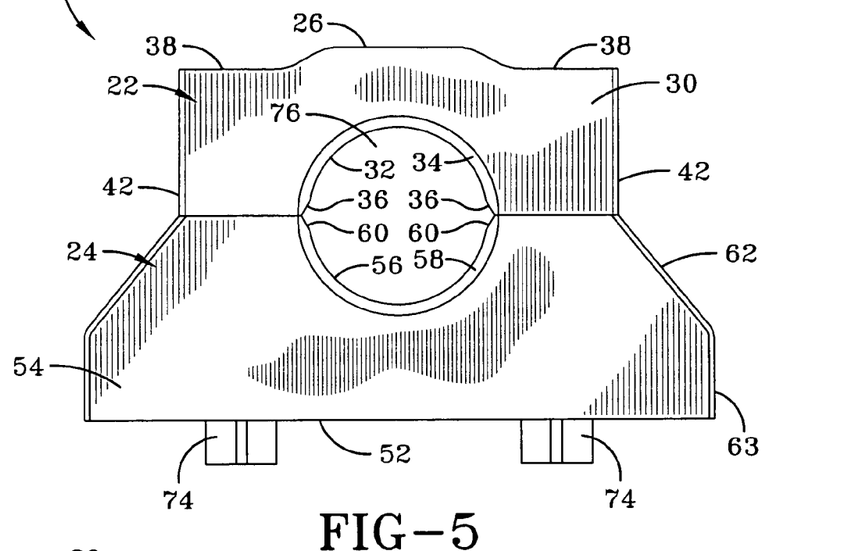
FIG. 5 is a front elevational view of an assembled cam journal constructed according to the concepts of the present invention.
Figure 6:
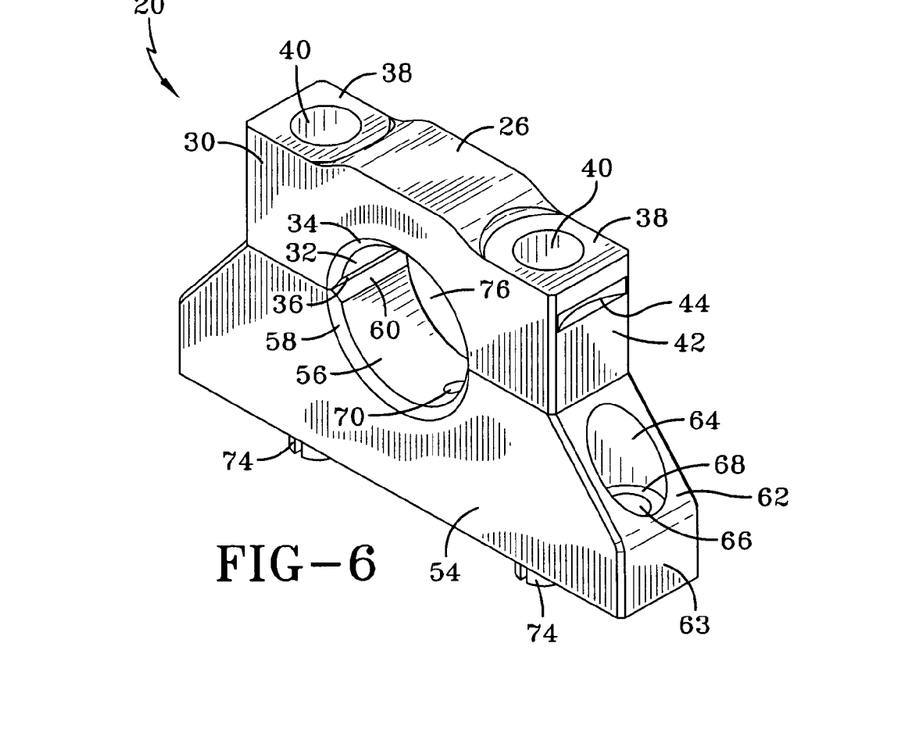
FIG. 6 is a perspective view of the assembled cam journal shown in FIG. 5.

Upper portion 22 is combined with lower portion 24 to form cam journal 20 as now to be described. Holes 40 of upper portion 22 are placed over the portions of bushings 74 protruding beyond top surface 50 of lower portion 24, so that bushings 74 extend into upper portion 22, and bottom surface 28 of upper portion 22 is brought into contact with top surface 50 of lower portion 24. As seen in FIGS. 5 and 6, upper bearing surface 32 and lower bearing surface 56 combine to form a generally circular bearing surface, which defines a camshaft bore 76. Chamfers regions 36 and 60 create a slight size tolerance at the widest point of the camshaft received in the bore 76, thus ensuring an easier fit between the camshaft and the cam journal 20. Once upper portion 22 and lower portion 24 are combined into cam journal 20, holes 40 are aligned with openings 72 and bushings 74 therein, to provide a continuous passageway that extends from shoulders 38 to bottom surface 52, and even beyond bottom surface 52 because of the extent of bushings.

Figure 7:
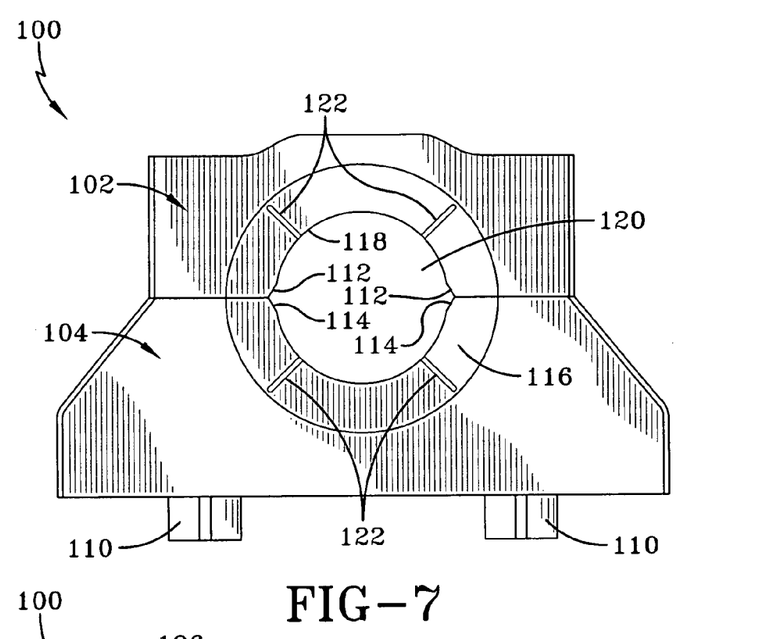
FIG. 7 is a front elevational view of a thrust cap cam journal constructed according to the concepts of the present invention.
Figure 8:
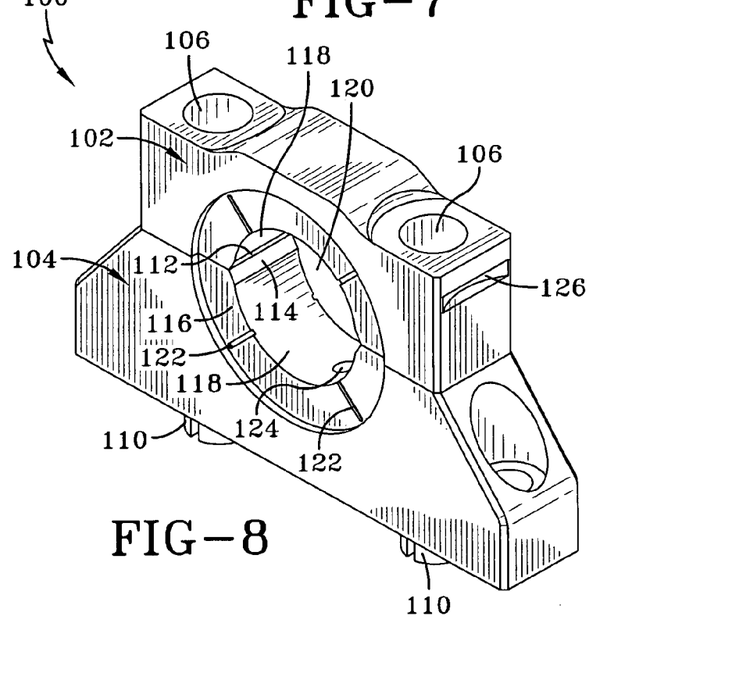
FIG. 8 is a perspective view of the thrust cap cam journal shown in FIG. 7.

Another embodiment which includes a cam journal 100, known as a thrust cap cam journal, is shown in FIGS. 7 and 8. Cam journal 100 is similar to cam journal 20 and thus includes an upper portion 102 and a lower portion 104, which are nearly identical to upper portion 22 and lower portion 24. Upper portion 102 includes holes 106 that are similar to holes 40, and lower portion includes holes (not shown) that are similar to openings 72. Cam journal 100 includes spring bushings 110 that connect upper portion 102 and lower portion 104, just as spring bushings 74 connect upper portion 22 and lower portion 24. Upper portion 102 also includes chamfer regions 112, and lower portion 104 includes chamfer regions 114, which are similar to chamfer regions 36, 60. However, rather than including circumferential beveled edges similar to circumferential beveled edges 32 and 58, cam journal 100 includes an annular portion 116 which is recessed from the front of upper and lower portions 102, 104 and which abuts a generally-circular shaped bearing surface 118, which defines a camshaft bore 120. Several oil grooves 122 are disposed around annular portion 116 and extend substantially radially to bearing surface 118, and are useful for holding oil onto annular portion 116 during operation. Cam journal 100 also includes an oil hole 124 in lower portion 104 similar to oil hole 70 of lower portion 24; and notches 126 in upper portion 102 similar to notches 44 of upper portion 22.

Cam journals 20, 100 may be made from any material of suitable durability for use in an automobile engine, such as aluminum alloys. Powder metal may also be used.

Figure 9:
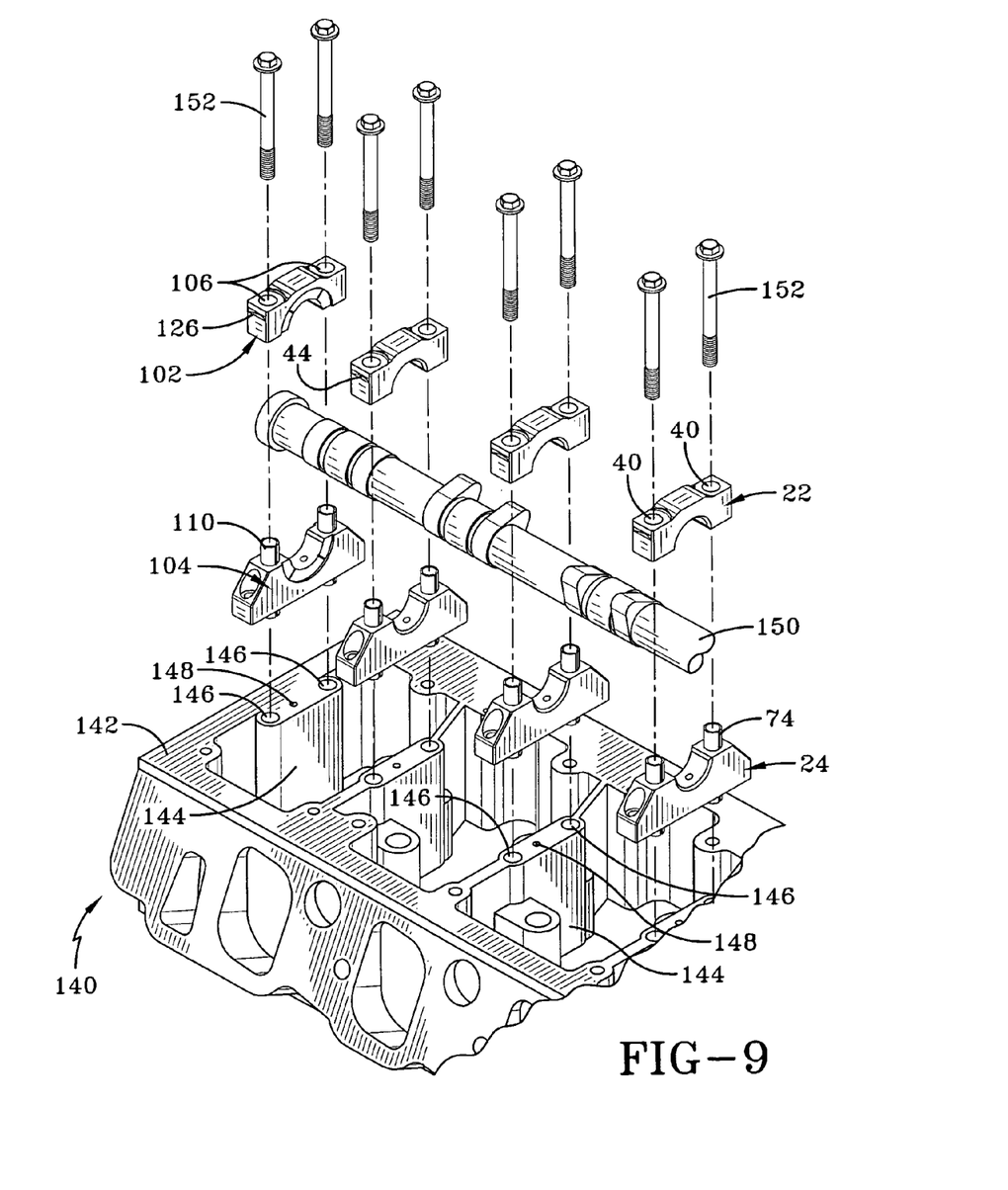
FIG. 9 is a fragmented exploded view showing the manner in which the cam journals constructed according to the concepts of the present invention are used to attach a camshaft to a cylinder head.
Figure 10:
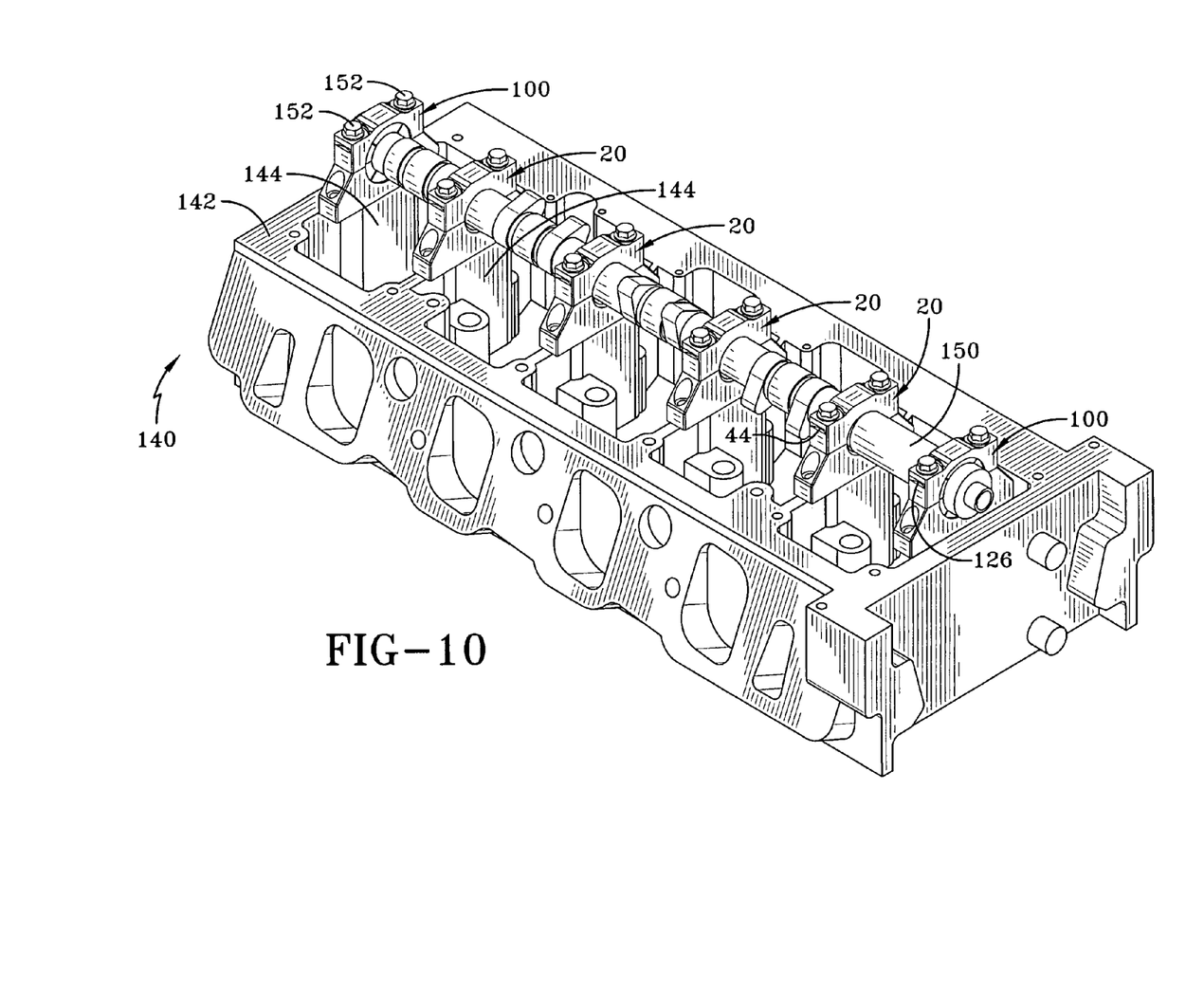
FIG. 10 is a perspective view showing a camshaft connected to a cylinder head by the cam journals (and the thrust cap cam journals) of the present invention.

A cylinder head is generally designated by the numeral 140 and is shown in FIGS. 9 and 10. Cylinder head 140 includes an upper deck surface 142 onto which a cylinder head cover (not shown) is attached. Cylinder head 140 also includes posts 144 which terminate in the same plane as upper deck surface 142 so that no part of cylinder head 140 extends beyond upper deck surface 142. Each post 144 includes a plurality of holes (three shown), two threaded holes 146 which are identical in diameter to holes/openings 40, 72, 106, and the holes that extend through portion 104 and which receive the threaded section of a bolt or screw, and an oil hole 148 which is identical in diameter to oil holes 70, 104. Oil holes 148 are connected to an oil distribution system which pumps oil through posts 144, and provides oil to the cam journals. Of course, practitioners in the art may find it useful to change the number and position of holes on the cylinder head without departing from the scope of the disclosed invention.

Cam journals 20, 100 may be attached to a cylinder head in the following manner. First, lower portions 24 are connected to cylinder head 140 by inserting the portion of the spring bushings 74 extending from the lower surface 52 of lower portions 24 into holes 146. Likewise, lower portions 104 may be connected to cylinder head 140 by inserting the portion of the spring bushings 110 extending from the lower surface of lower portions 104 into holes 146. This brings the lower portions of cam journals 20, 100 into contact with upper deck surface 142. Oil holes 148 thus communicate with oil holes 70, 104 so that oil that is pumped up through posts 144 will flow through the lower portions 24, 104 and emerge at lower bearing surfaces 56 and 118. Next, a camshaft 150 is positioned so that it rests on the lower portions 24, 104. Then, upper portions 22, 102 may be attached to lower portions 24, 104. Particularly, holes 40 of upper portions 22 are placed over the portions of bushings 74 protruding beyond top surface 50 of lower portions 24, so that bushings 74 extend into upper portions 22, as discussed previously. Likewise, holes 106 of upper portions 102 are placed over the portions of bushings 110 protruding upward from the top surface of lower portion 104, so that bushings 110 extend into upper portions 102. Finally, a bolt is used to secure each cam journal 20, 100 to cylinder head 140. Specifically, bolts 152 are placed into the holes extending through the upper and lower cam journal portions and into holes 146. Bolts 152 are threaded into the threaded section of holes 146 until the cam journals are snuggly attached to the cylinder head. Of course, other headed fasteners, or similar items could be used to attach the cam journals to the cylinder head. The cam journals could optionally be further attached to a cylinder head by using fasteners that extend through other holes in the cam journals, such as large diameter holes 64 and small diameter holes 66, and connect in appropriately placed holes in the cylinder head.

Cylinder head 140 is shown in FIG. 10 with cam journals 20, 100 attached. Camshaft 150 is situated between the upper and lower cam journal portions and fills the camshaft bores 76, 120. As shown, thrust cap cam journals 100 are preferably used at each end of the cylinder head, and cam journals 20 are used between the thrust cap cam journals.

Cam journals 20, 100 are also easily removed from cylinder head 20. Once bolts 152 are loosened, upper portions 22, 102 can be separated from lower portions 24, 104. If it is difficult to remove upper portions 22, 102 from lower portions 24, 104, perhaps because of a tight fit with bushings 74, 110, one may use a wrench, pliers, or similar tool, and pull the upper portions apart from the lower portions. Also, the notches 44, 126 may be useful for separating the upper and lower portions by providing a user with a place to grip the upper portions or pry the upper portions away from the bottom portions. Once upper portions 22, 102 are removed, camshaft 150 may be lifted off lower portions 24, 104, which lower portions may then be disconnected from cylinder head 140.

In addition to being installed on a cylinder head that is specially designed to receive them (such as cylinder head 140), cam journals constructed according to the concepts of the present invention may be used to connect a camshaft to a cylinder head which has integral posts that extend beyond the top deck surface of the cylinder head. This would be an especially useful way to preserve a cylinder head where the integral posts might be damaged, but the cylinder head is otherwise sound. In order to connect the cam journals to such a prior art cylinder head, a machinist must remove the portion of the integral posts that extend beyond the top deck surface of the cylinder head, thereby preparing a surface for attaching the cam journals where the surface is in the same plane as the top deck surface. In other words, a prior art cylinder head may be milled down, or otherwise machined, so as to resemble the upper deck surface 142 and posts 144 shown in FIGS. 9 and 10. Holes may then be drilled in this modified cylinder head to create holes similar to holes 146 in order to receive the bushings and bolts, thereby allowing the cam journals to be connected to the cylinder head, as disclosed above.

Figure 11:
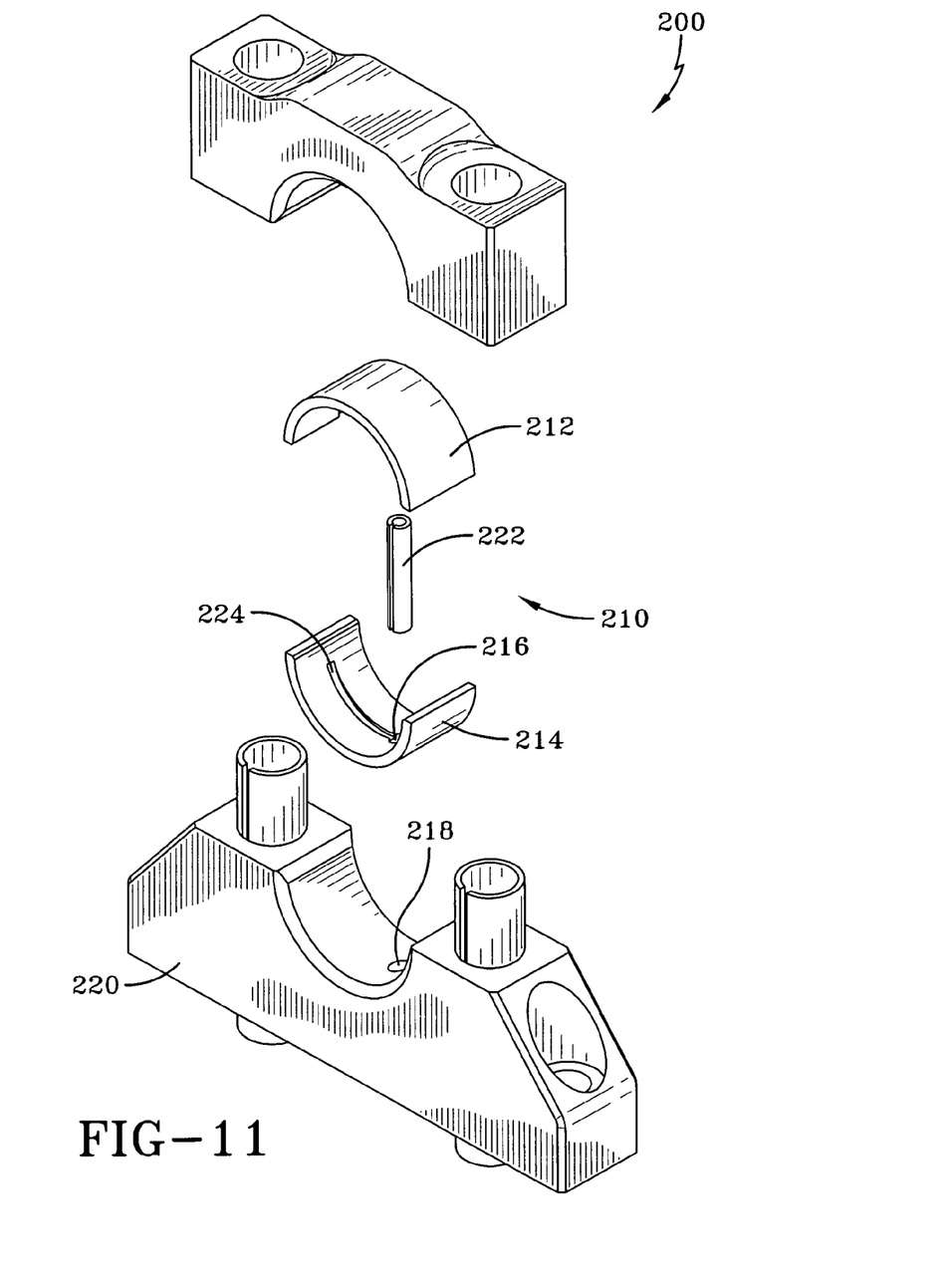
FIG. 11 is an exploded view of a cam journal constructed according to the concepts of the present invention and including a shell bearing.

As shown in FIG. 11, cam journals 200 constructed according to the concepts of the present invention may include shell bearings 210. Cam journal 200 is substantially similar to cam journals 20, 100 and thus may take the form of a cam journal or a thrust cap cam journal. A shell bearing 210 of cam journal 200 includes an upper portion 212 and a lower portion 214, which is provided with a hole 216. Upper portion 212 and lower portion 214 are mateable and are positioned in cam journal 200 so that hole 216 of lower portion 214 is in communication with an oil hole 218 in the lower portion 220 of the cam journal. A bushing 222 is inserted into hole 216 and into oil hole 218, thereby preventing the rotation of shell bearing 210 within cam journal 200. Shell bearing 210 may optionally include an oil groove, such as oil groove 224 shown in the figure.

Figure 12:
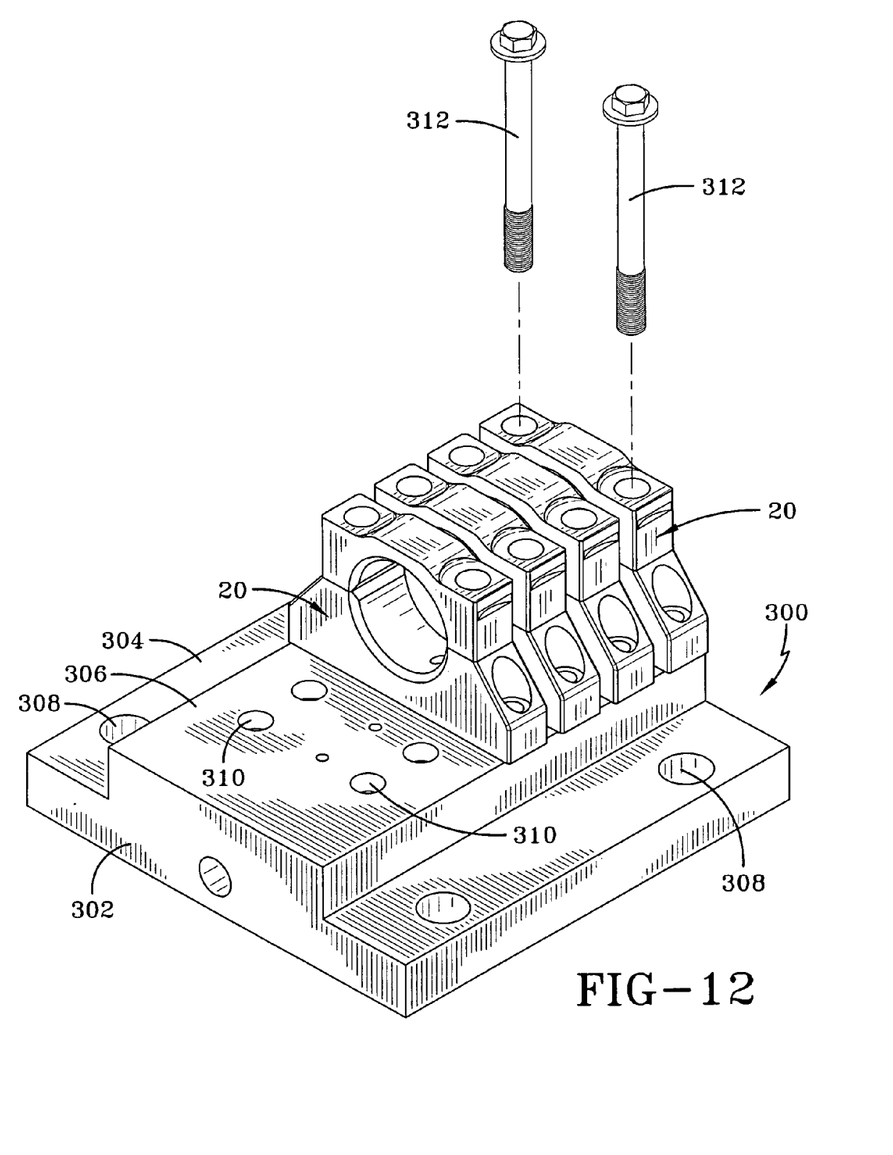
FIG. 12 is a perspective view showing a bore alignment fixture that may be used in the manufacture of cam journals constructed according to the concepts of the present invention.

Because the cam journals 20, 100, 200 are modular components that include upper and lower portions that are removable from a cylinder head, it is easier to precision-machine the camshaft bore than in prior art forms. Again, the bores of prior art cam caps are machined once the cam caps are installed on a cylinder head or cylinder head casting. Drilling precision bores on such an arrangement required large and expensive machinery. In contrast, the bores of cam journals constructed according to the concepts of the present invention are more easily machined. To that end, a bore alignment fixture 300 is shown in FIG. 12 with several cam caps connected thereto. Bore alignment fixture 300 may be used in the precision-machining of any of the cam caps constructed according to the concepts of the present invention, such as cam journal 20, thrust cap cam journal 100, or cam journal with shell bearings 200; however, for purposes of this description, only cam journals 20 are shown in FIG. 12. Bore alignment fixture 300 includes a body 302 having side decks 304 and an upper deck 306 situated therebetween and elevated therefrom. Side decks 304 include holes 308 for mounting the bore alignment fixture to a table or drilling assembly. Upper deck 306 includes threaded holes 310 for mounting cam journals 20 thereto, as by bolts 312. As shown in FIG. 12, the upper and lower portions of cam journals 20 are assembled together and the cam journals are bolted to bore alignment fixture 300. Once the cam journals are secured to the bore alignment fixture, and the bore alignment fixture is secured to a table or drilling assembly, a precision drill may be used to machine the camshaft bore to the desired dimensions. Once the camshaft bore is completed, the cam journals may be used as previously described.

The arrangement shown in FIG. 12 allows more efficient machining of the camshaft bores. Unlike in prior art forms, a long drill bit is not required to drill down the length of a cylinder head, so more camshaft bores may be drilled in a shorter area. Thus, more accurate line-boring of camshaft journal bores is achieved because of the decreased drill deflection made possible by shortening the distance between bores. More accurate line-boring of camshaft journal bores means that less cylinder head castings are scrapped during production. Also, a more consistent cam journal surface hardness is achieved, and the journal surface finish is not affected by casting porosity. In addition, different materials may be used depending on a particular application, and different wear coatings may be used on camshaft journal bores for increased durability, such as moly-graphite.

Cam journals constructed and installed according to the concepts of the present invention offer several advantages over prior art forms. Specifically, if any of the cam journals become damaged during operation, only a machined set of cam journals need be replaced, rather than the entire cylinder head casting. Previously, if any of the integral posts of the cylinder head were damaged, the entire cylinder head had to be replaced. Thus, using cam journals constructed according to the concepts of the present invention will contribute to the efficient use of materials and discourage waste. Also, the cam journals disclosed herein may be attached to a variety of cylinder heads, thereby encouraging the preservation of cylinder heads whose damage is limited to the integral posts supporting the camshaft. Further, the chamfer regions on both the upper and lower portions of the cam journals of the present invention create a slight size tolerance at the widest point of the camshaft bore, thus ensuring an easier fit between the camshaft and the cam journal. In addition, cam journals constructed according to the concepts of the present invention are easier to machine and are modular components that may be installed, removed, or changed as desired.

Thus, it should be evident that a cam journal constructed in accordance with the present invention accomplishes the objects of the invention and otherwise substantially improves the cylinder head art.

What is claimed is:

1. A cam journal for attaching a camshaft to a cylinder head in an overhead camshaft engine, the cam journal comprising an upper portion, and a separate lower portion attachable to the cylinder head and to the upper portion, such that when said upper portion and said lower portion are attached, a bearing surface is formed to define a camshaft bore between said upper and lower portions, wherein said upper portion includes a generally semi-circular bearing surface, a front surface, and a beveled edge between said bearing surface and said front surface.

2. A cam journal for attaching a camshaft to a cylinder head in an overhead camshaft engine, the cam journal comprising an upper portion, and a separate lower portion attachable to the cylinder head and to the upper portion, such that when said upper portion and said lower portion are attached, a bearing surface is formed to define a camshaft bore between said upper and lower portions, wherein said upper portion includes a generally semi-circular bearing surface, a bottom surface and at least one chamfer region between said bearing surface and said bottom surface.

3. The cam journal of claim 2, wherein said upper portion includes a front surface and a beveled edge between said bearing surface and said front surface.

4. The cam journal of claim 1, wherein said lower portion includes a generally semi-circular bearing surface.

5. The cam journal of claim 4, wherein said lower portion includes a front surface and a beveled edge between said bearing surface and said front surface.

6. The cam journal of claim 4, wherein said lower portion includes an upper surface and at least one chamfer region between said bearing surface and said upper surface.

7. The cam journal of claim 6, wherein said lower portion includes a front surface and a beveled edge between said bearing surface and said front surface.

8. The cam journal of claim 1, wherein said lower portion has a bottom surface, and further comprising an oil hole extending from said bearing surface to said bottom surface.

9. The cam journal of claim 1 further comprising a shell bearing positioned in said bearing surface.

10. A cam journal for attaching a camshaft to a cylinder head in an overhead camshaft engine, the cam journal comprising an upper portion, and a separate lower portion attachable to the cylinder head and to the upper portion, such that when said upper portion and said lower portion are attached, a bearing surface is formed to define a camshaft bore between said upper and lower portions, wherein said upper portion includes side surfaces and at least one notch in at least one of said side surfaces.

11. A cam journal for attaching a camshaft to a cylinder head in an overhead camshaft engine, the cam journal comprising an upper portion, and a separate lower portion attachable to the cylinder head and to the upper portion, such that when said upper portion and said lower portion are attached, a bearing surface is formed to define a camshaft bore between said upper and lower portions, wherein said upper portion has at least one hole extending therethrough, and said lower portion has at least one hole extending therethrough, and a bushing is carried by said holes of said upper portion and said lower portion.

12. An engine component comprising a cylinder head, a camshaft, and at least three cam journals spaced along said camshaft that are each removably attached to said cylinder head, said cam journals each having an upper portion and a lower portion defining a bearing surface for said camshaft, wherein each said upper portion includes a bottom surface and a generally semi-circular bearing surface, and at least one chamfer region connecting said bottom surface to said bearing surface, and wherein each said lower portion includes a top surface and a generally semi-circular bearing surface, and at least one chamfer region connecting said top surface to said bearing surface.

13. The component of claim 12, wherein said upper portion includes a front surface and a beveled edge connecting said front surface to said bearing surface, and wherein said lower portion includes a front surface and a beveled edge connecting said front surface to said bearing surface.

14. The engine component of claim 12, further comprising a shell bearing positioned in each said bearing surface.

* * * * *